H. RÜEDY.
MOTOR TRUCK.
APPLICATION FILED OCT. 12, 1916.
1,305,171.
Patented May 27, 1919.
3 SHEETS—SHEET 1.
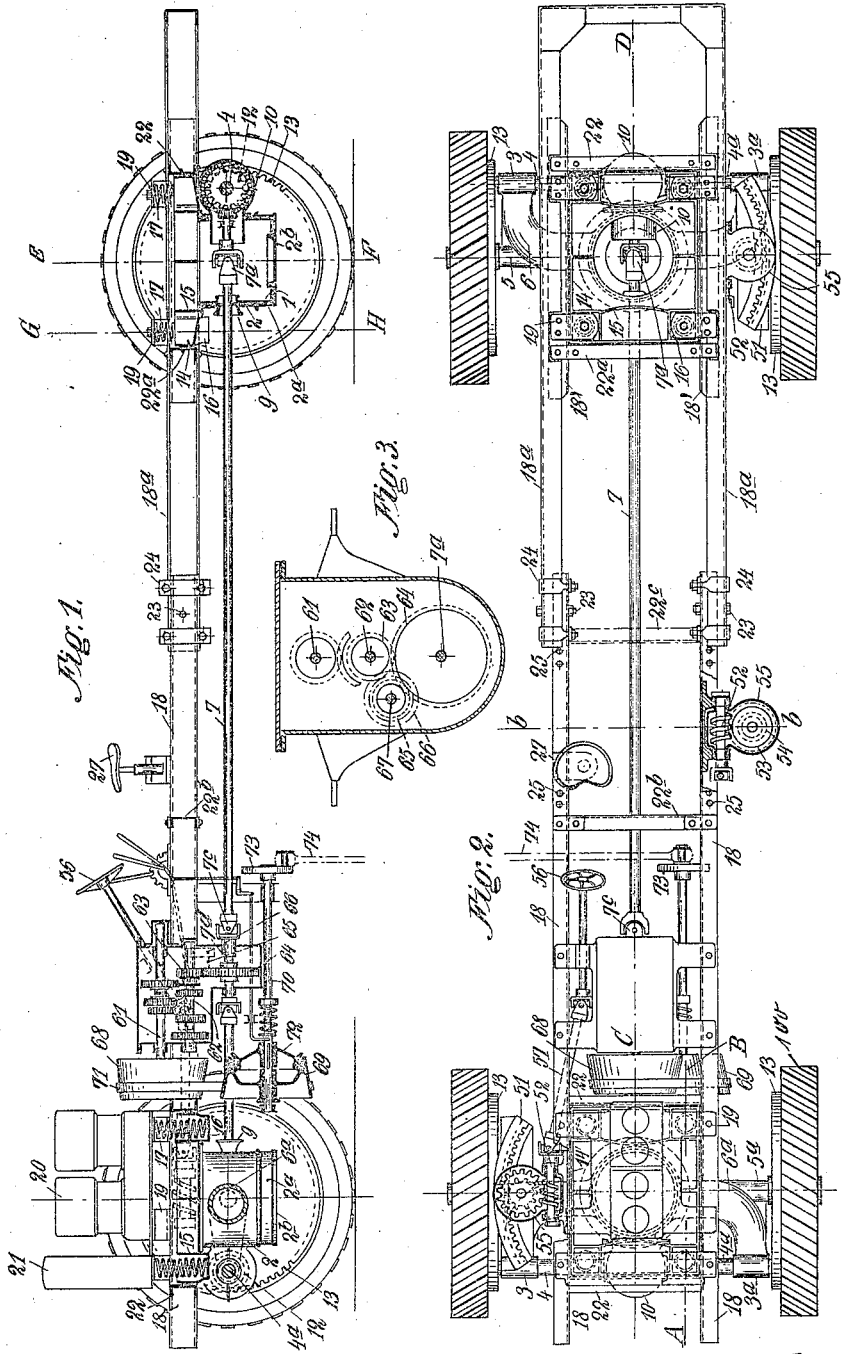
Witnesses:
Inventor:

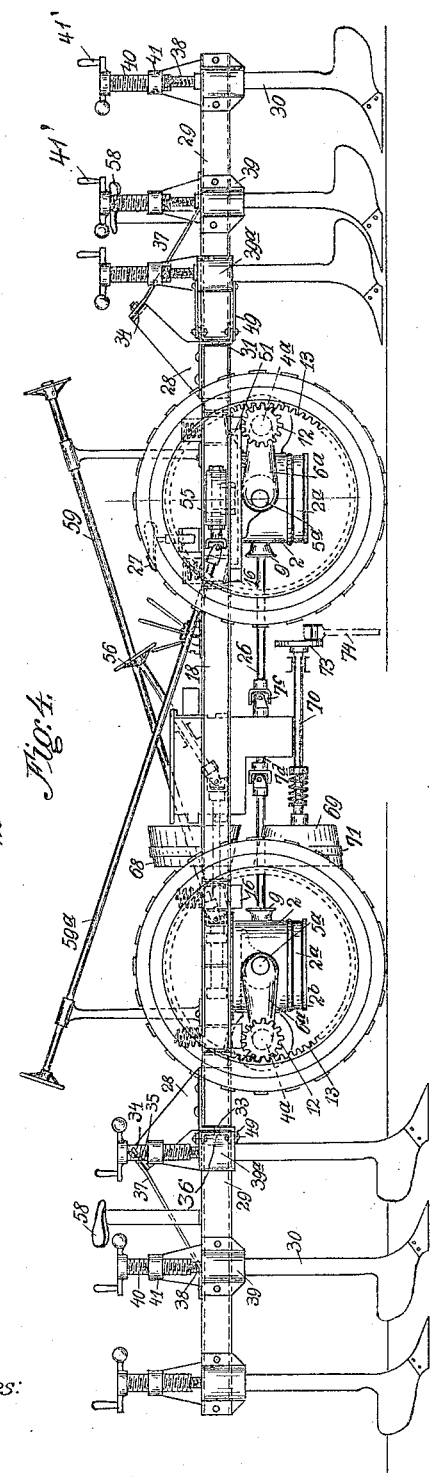

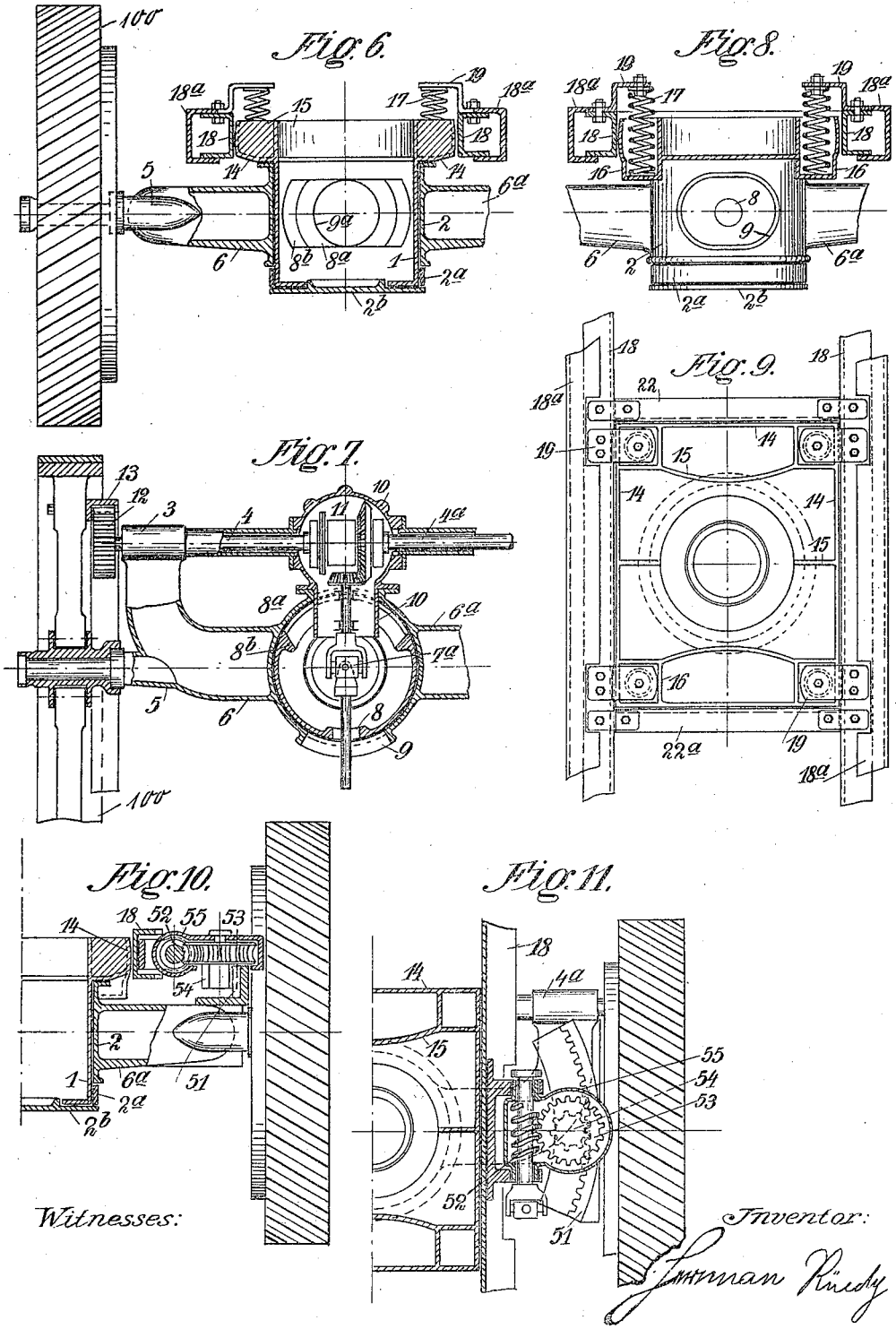

UNITED STATES PATENT OFFICE.

HERMANN RÜEDY, OF JESTETTEN, GERMANY.

MOTOR-TRUCK.

1,305,171.  Specification of Letters Patent.  Patented May 27, 1919.

Application filed October 12, 1916. Serial No. 125,301.

*To all whom it may concern:*

Be it known that I, HERMANN RÜEDY, a subject of the German Emperor, and residing at Jestetten, Grand Duchy of Baden, German Empire, have invented certain new and useful Improvements in Motor-Trucks, of which the following is a specification.

The present invention has reference to an improved convertible motor truck or lorry, and relates more particularly to improved means which allow of a motor truck being alternately used for commercial purposes, such as freight or merchandise delivery, or for agricultural purposes, especially plowing and mowing.

The improvements essentially consist in the construction of strong and low-hung steering pillars of relatively large diameter, one for each wheel pair, which greatly minimizes the danger of upsetting and facilitates steering when covering soft, uneven ground; and in means for shortening the distance between the pairs of traction wheels by shifting the rear wheel axle with steering pillar, suspension springs, wheels and other accessories closer up to the front wheels, and providing separate steering and driving mechanisms for the rear wheels, so that the truck can be run in either direction, thus obviating the necessity of having to turn around at the end of each course. With these and other improvements to be described farther on the invention substantially consists in the construction, arrangement and coöperation of parts, constituting a convertible truck, as will now be fully described with reference to the accompanying drawings, in which—

Figure 1 illustrates the improved tractor in vertical longitudinal section on line A—B—C—D of Fig. 2, as adapted for commercial purposes; Fig. 2 illustrates a plan view thereof, with parts of the steering mechanism in horizontal section; Fig. 3 illustrates the change speed gear in cross-section; Fig. 4 illustrates a side elevation of the shortened truck, partly in section, as adapted for plowing; Fig. 5 illustrates a plan view thereof; Fig. 6 illustrates the steering axle and adjacent parts, vertically sectioned on line E—F of Fig. 1; Fig. 7 illustrates a horizontal section through Fig. 6; Fig. 8 illustrates the steering axle and accessories, partly sectioned on line G—H of Fig. 1; Fig. 9 illustrates a plan view thereof; Fig. 10 illustrates the steering gear in vertical section through the axle; Fig. 11 illustrates a plan view thereof, partly in section; Fig. 12 illustrates a sectional view of the plow carrier.

Like characters of reference are used for like parts throughout the several views.

In order to be able to use a motor lorry for agricultural purposes, such as plowing or mowing, it is imperative that both wheel pairs are positively driven and steerable, independently of one another, it being inadvisable for various reasons to turn the vehicle around at the end of each furrow. For this purpose each steering axle comprises two nested hollow cylinders 1 and 2 (Fig. 6) of relatively large diameter, the inner cylinder 1 resting with its upper edge flange loosely on the upper flange of the outer cylinder 2, just above the wheel axle. The outer cylinder can rotate about the inner one for steering purposes to a limited extent and is provided with oppositely extending splayed carrying members 6, $6^a$, 5, $5^a$, for respectively journaling the differential driving shafts 4, $4^a$ in end bearing sleeves 3, $3^a$ and rotatably supporting the traction wheels 100 (Figs. 2 and 7). At the bottom the inner cylinder is closed by a circumferentially projecting, screwed-on bottom plate $2^b$ which prevents upward displacement of the cylinder 1 within its housing 2. The lower part of the housing is formed by a loose sleeve or annulus $2^a$ (Fig. 8), which can readily be exchanged for special, hereinafter described purposes for a similar annulus, after the bottom plate $2^b$ has been unscrewed. The two steering pillar cylinders are provided at their inner portion with slots 8 and 9 respectively for the passage of the Cardan shaft, the Cardan joints $7^a$ and $7^b$ respectively being situated at the axle center of the steering pillars (Fig. 5). The slot 9 in cylinder 2, obviously, must be of sufficient extent to allow of steering leeway in either direction, without interference on the part of the Cardan shaft. Diametrically opposite to the slots 8, 9 the cylinders are provided with proportionately dimensioned slots $8^a$ and $9^a$ for the reception of the case 10 housing the differential gear 11. This case 10 is suitably secured to the outer cylinder 2, for instance by a flange joint, so that it is taken along on the outer cylinder being displaced relative to the inner one, flange terminals 8$^b$ of the slot 8$^a$ limiting the relative steering displacements. The differential shafts 4, 4$^a$ extend from the case 10 parallel to the wheel axle and mesh with their end pinions 12 (Fig. 7) with an internal spur-gear 13 on each traction wheel.

Steering is brought about by rotation of the outer cylinder 2 about the inner cylinder 1, the latter being held stationary. For this purpose the supporting flange of the inner cylinder of each steering pillar is formed in the shape of a rectangular, upwardly directed hollow frame structure 14 having strengthening ribs 15 (Figs. 6 and 9), in the depressed corners 16 (Fig. 8) of which suspension springs 17 are provided for supporting the vehicle body. The latter mainly consists of the two reach beams 18, which are supported on the springs 17 by means of the bracket members 19, the reach beams extending closely alongside of the longitudinal walls of the frame structure 14. For the front steering pillar the brackets 19 can be secured to the motor 20 or to the cooler 21 (Fig. 1), while for the rear pillar the brackets are readily removably secured to the reach beams. Near each transverse wall of the frame 14 the two longitudinal beams 18 are connected and braced by bridge girders 22, the frame structures 14 thus being completely inclosed by the body frame, which prevents them from being displaced under stress and guides them on the vehicle body executing vertical oscillations relative to the steering pillars.

The short rear side beams 18' are removably secured to the somewhat enlarged carrier members 18$^a$, which in turn are removably secured to the rear ends of the reach beams 18 by screw bolts 23 and straps or stirrups 24 (Figs. 1 and 2). By undoing these connections and the brackets 19 from the rear beams 18', the hind wheel axle and pillar are freed, and by removing the cross-bridge 22$^a$, the rear portion of the body frame can be detached from the front portion. The Cardan shaft 7 is then disconnected at the universal joints 7$^a$ and 7$^c$, which latter is provided near the change speed gear, and is removed, and the hind wheel pair with its steering pillar can now be suitably secured to the rear end of the front frame beams 18. For this purpose there are provided bolt holes 25 (Fig. 2) for the spring brackets 19 and an additional bridge or brace 22$^b$ for positioning the frame structure 14 in its new place. A further brace 22$^c$ is then screwed on behind. The removed Cardan shaft 7 is replaced by a shorter shaft 26 (Fig. 4) and the latter operatively connected to the joints 7$^a$ and 7$^c$, when the thus shortened vehicle presents a very compact appearance and is eminently fit for heavy agricultural work.

The seat 27 for the driver can readily be removed for facilitating the positioning of the rear steering pillar.

The location of the bolt holes 25 and of the member 22$^b$ is such that a portion of the front reach beams 18 extends rearwardly beyond the rear pillar. A similar portion of the reach beams extends at the front of the vehicle, and these projecting beam portions serve to accommodate each a bracket member 28 to which a frame 29 supporting the plow shares 30 is secured. The bracket 28 comprises two rectangular side walls, whose vertical flanges fit between the reach beams 18 and whose horizontal flanges rest upon the latter and are suitably secured thereto. A transverse wall 31 connects the two side walls and is provided below with a horizontal supporting flange 32 for the plow carrier and with a bolt slot 33 (Fig. 4). The side walls of the bracket extend upwardly and are joined at the upper end by an obliquely directed plate 34, slotted as at 35. The plow carrier 29 is in the shape of a rectangular triangle and is secured with its shorter base to the bracket 28 upon the supporting flange 32. The wall of the carrier 29, contacting with the wall 31 of the bracket, is provided with a slot 36 coinciding with the slot 33, and bolts passed through these slots connect the parts. A strut 37 connects the plow carrier with the bracket 28, its upper end being suitably secured in the slot 35 of the end plate 34. By reason of this slot arrangement each plow carrier can be displaced on its supporting base laterally, i. e. crosswise of the vehicle axis. The plow shares, as shown by way of example three on each carrier, are secured, one behind the other, on the long side of the triangle. Upon the lorry reaching the end of the furrow, the active set of plows must be raised and the other set lowered, as the vehicle is not supposed to turn around.

In order to quickly raise and lower the individual plow shares, they are provided with spindles of square or rectangular cross-section below and with screw thread 38 above, the lower portion of these spindles being guided in bosses 39 on the plow carrier and the upper portion threading in sleeves 40. These latter are provided with external thread of opposite direction to their internal thread and operate in guide sleeves 41. If, then, a sleeve 40 is raised or lowered by manipulation of its crank handle 41', the respective spindle 38 will operate in this sleeve 40 in the same sense, so that the plow share is given a twofold operative speed movement.

For shortening the vehicle as much as possible the plow carriers are located so near the vehicle ends that each innermost plow comes within the domain of the swung around respective wheel pair, and for removing the inner plows from out of this domain on sharp turns, their guide bosses 39ª (Fig. 5) can be secured to the carrier 29 by a set of swing arms 49. Lugs 50 extending from the boss 39ª over the carrier 29 are secured to the latter by means of a linch pin or the like. Upon the pin being withdrawn, the boss 39ª can be swung outwardly on its swing arms into the position shown in full lines in Figs. 4 and 5, and can then be temporarily secured in this position in suitable manner.

The rotation of the outer pillar cylinder 2 for steering the wheel axles is caused by toothed segment and worm gear. On each wheel axle is secured a toothed segment 51 which is operated by a worm gear 52, 53, 54. The worm gear for the rear wheel pair, upon shortening of the truck, will assume the position indicated in Fig. 2 with the axis $b$—$b$, where there is shown an auxiliary worm gear, which obviates the shifting of the main rear worm gear to this point. The worm wheel is of a width to extend below the worm 53, as at 54 (Fig. 10), for meshing with the vertically disposed teeth of the steering segment 51, which allows of the truck body oscillating up and down without fear of disengagement of the worm and wheel; and for the purpose of still more securely preventing such a disengagement, the housing 55 of the worm wheel may be pivoted to the shaft of the driving worm, the vertical base circle of the segment serving as foot rest for the worm wheel, so that the latter together with its housing can oscillate in vertical direction.

The worm gear is operated from the steering wheel over the interposed Cardan shaft 57. When using the truck for plowing, the driver's seat 58 is moved back over the plow carrier and the Cardan shaft 57 is replaced by a longer one 59 (Figs. 4 and 5). A similar steering gear with shaft 59ª is provided for operating the rear wheel axle. These steering shafts are readily removable for reconverting the motor plow into an ordinary delivery truck.

For operating the vehicle on different speeds, the Cardan shaft 7 coöperates with the usual change speed gear (Figs. 1 and 3). The motor shaft 61, for instance, carries three differently dimensioned toothed wheels, any one of which, by being shifted along the shaft, may be brought into mesh with one of the toothed wheels on the parallel shaft 62, on which latter also rides loosely the intermediate wheel 63, which in turn meshes with the driving wheel proper 64, fixed on the Cardan shaft 7ᵈ. With this wheel 64 meshes the wide-toothed wheel 65 on shaft 67, which latter extends parallel to the shaft 62 (Fig. 3) and carries a normally disengaged toothed wheel 66. By shifting the wheel 63 on its shaft 62, this wheel 63 and the driving wheel 64 can be disconnected, and the intermediate wheel 63 can be brought into mesh with the wheel 66 fast on the wheel 65, with the result that now motion is transmitted from wheel 63 to wheel 64 by the aid of the wide wheel 65, which causes the Cardan shaft 7 to rotate in reverse direction. On the wheel 63 being shifted only sufficiently to disconnect it from the wheel 64, without causing the wheel 63 to mesh with the wheel 66, the wheel 64 and thus the Cardan shaft will remain stationary.

The motor pulley 68, which takes the place of the fly-wheel, is coneshaped, and a similar pulley 69, with coupling clutch 72 and facing in the other direction, is provided on a shaft 70 and is driven from the motor cone 68 by the belt drive 71. By axially shifting the belt on the two cones, the shaft 70 can be rotated at various speeds, irrespective of the motor speed.

The shaft 70 may be used for actuating other operative parts, for instance a mowing mechanism. For this purpose there is provided a crank disk 73 at the end of this shaft 70, to which may be connected the crank rod 74 operating the knife bar of a mower of any approved construction.

What I claim is:

1. In a motor truck, in combination with the motor and the running gear, two steering mechanisms, one for each wheel pair, each said mechanism comprising two nested hollow cylinders of relatively large diameter, means for preventing relative axial displacement between said cylinders, an exchangeable loose annulus forming the lower part of said outer cylinder, and the outer cylinder for steering purposes adapted to be rotated about the inner cylinder, means for limiting this relative rotary movement, and means in connection with said outer cylinder for respectively supporting the traction wheels and the differential gear mechanism for driving the traction wheels.

2. In a motor truck, in combination with the frame and the running gear, a steering pillar for each wheel pair comprising two nested cylinders of relatively large diameter, an upper supporting flange on the inner cylinder formed into a rectangular upwardly directed hollow frame structure, strengthening ribs thereon and its corners being depressed, suspension springs in said depressions, brackets removably secured to the running gear frame and coöperating with said suspension springs, cross braces secured to the running gear frame, said supporting parts adapted to position said hollow frame structure and prevent said inner cylinder from being rotatably displaced relative to said supporting parts but allowing axial oscillation thereof under road stress.

3. In a motor truck, in combination with the frame and the running gear, a toothed steering segment on each wheel axle, a worm gear secured on the truck frame, a long-toothed wheel on the worm wheel, adapted to allow of relative vertical displacement between truck frame and wheel axle without disengagement of said meshing members, a case for the said worm wheel, and means for pivotally securing said case to the shaft of the worm.

4. In a motor truck, in combination with the motor and the running gear, a motor driven shaft, a cone-shaped pulley on this shaft, a Cardan shaft, a fixed toothed wheel thereon, a shaft interposed between said motor driven shaft and said Cardan shaft, a cone-shaped pulley journaled on the truck frame, the two said cones facing in opposite directions, transmission gears operatively inter-connecting the several said shafts, a fourth shaft journaled on the truck frame coaxially of the second said cone pulley, clutch means for throwing this fourth shaft into, or out of, coupling coöperation with the second said cone pulley, belt drive between the two said cone pulleys, and means on said fourth shaft for actuating other operative parts.

5. In a motor truck in combination with the frame and the running gear, a steering pillar for each wheel pair comprising two nested cylinders of relatively large diameter, an upper supporting flange on the inner cylinder and including an upwardly directed hollow frame structure, suspension springs supported by the frame structure, brackets carried by the running gear frame and coöperating with said suspension springs, cross braces secured to the running gear frame, said supporting parts adapted to position the said hollow frame structure and prevent said inner cylinder from rotatable displacement relative to said supporting parts but allowing axial oscillation thereof under road stress.

6. In a motor truck, the combination with the frame and the gear, a steering pillar for each wheel pair comprising two nested cylinders, an upper supporting flange on the inner cylinder constituting a frame structure, said frame structure having spring seats therein, suspension springs in the said seats, brackets secured to the running gear frame and coöperating with said suspension springs, cross braces secured to the running gear frame, said supporting parts adapted to position said hollow frame structure and prevent said inner cylinder from being rotatably displaced relative to said supporting parts but allowing axial oscillation thereof under road stress.

7. In a motor truck, in combination with the motor and the running gear, two steering mechanisms, one for each wheel pair, each said mechanism comprising two nested hollow cylinders of relatively large diameter, means for preventing relative axial displacement between said cylinders, a closure for the lower end of the inner cylinder, and the outer cylinder for steering purposes adapted to be rotated about the inner cylinder, means for limiting this relative rotary movement, and means in connection with said outer cylinder for respectively supporting the traction wheels and the differential gear mechanism for driving the traction wheels.

In testimony whereof I affix my signature in presence of two witnesses.

HERMANN RÜEDY.

Witnesses:
  OLGA M. AURIG,
  AUGUST RÜEGG.

Copies of this patent may be obtained for five cents each, by addressing the "Commissioner of Patents, Washington, D. C."